United States Patent [19]

Kim et al.

[11] 4,313,962

[45] Feb. 2, 1982

[54] PRODUCTION OF LOW CHOLESTEROL CASEIN

[75] Inventors: Chong Y. Kim, Elkhart; Moshe M. Sternberg, South Bend, both of Ind.

[73] Assignee: Miles Laboratories, Inc., Elkhart, Ind.

[21] Appl. No.: 140,690

[22] Filed: Apr. 16, 1980

[51] Int. Cl.³ .................. A23C 9/12; A23J 1/20; C07G 7/00
[52] U.S. Cl. .................. 426/35; 426/36; 426/42; 435/272
[58] Field of Search .................. 426/34, 35, 36, 42, 426/582; 435/198, 272, 11, 18, 19

[56] References Cited

U.S. PATENT DOCUMENTS 3,884,764  5/1975  Goodhue et al. .................. 435/11
4,179,334  12/1979  Esders et al. .................. 435/19
4,255,455  3/1981  Hetley et al. .................. 426/42

OTHER PUBLICATIONS

New Zealand Dairy Board, Edible Rennet Casein, Mar. 1977 (pp. 1–17).
Webb et al., Fundamentals of Dairy Chemistry, The Avi Publishing Co., Inc., Westport Conn., 1965 (p. 32).

*Primary Examiner*—David M. Naff
*Attorney, Agent, or Firm*—Jerome L. Jeffers

[57] ABSTRACT

Casein having a reduced cholesterol content is obtained by treating skim milk at a pH of about 6.0 to 6.9 with a pancreatic lipase having lipase activity and protease activity for a time sufficient to dissociate the casein from cholesterol therein and then coagulating the casein by enzymatic means.

10 Claims, No Drawings

PRODUCTION OF LOW CHOLESTEROL CASEIN

BACKGROUND OF THE INVENTION

Cheese analogs are conveniently prepared from milk solids i.e., casein, which is precipitated from skim milk either by acid precipitation or enzymatic coagulation.

Cholesterol or cholest-5-en3$\beta$-ol is the principle steroid of higher animals. It is found in all body tissues, especially in the brain, spinal chord and in animal fats and oils. Cholesterol, which is known to be the precursor of bile acids, steroid hormones and pro-vitamin D3, is basically obtained by the body from the diet even though a major portion needed for normal mody functions is endogenously snythesized. Epidemiological and nutritional studies have shown that an elevation of cholesterol in blood plasma is one of the more important risk factors leading to coronary heart disease. For this reason, medical authorities advise patients with elevated blood serum cholesterol levels and whose family history includes early deaths from arteriosclerosis to restrict fat intake and in particular, cholesterol, and to avoid foods which are generally known to contain high cholesterol levels. Cheese is known to contain cholesterol and should be avoided by individuals on a cholesterol restricted diet. Cheese analogs which are prepared from casein or caseinates still contain cholesterol because of relatively large amounts of cholesterol present in the casein.

Casein is a mixture of phosphoproteins naturally occuring in milk. This material contains all of the common amino acids and is particularly rich in essential amino acids. Due to its desirable nutritional balance, casein is very useful as an ingredient in many food products, particularly cheese analogs. We have found that cholesterol distributes unevenly between casein and whey when the former is precipitated from skim milk. Thus if one starts with 100 ml of skim milk and subjects it to the conventional process of acid precipitation of casein, 36.3% of the colesterol is found in the liquid phase, i.e. whey, and 48.8% in the solid phase, i.e., casein. Moreover, it has been found that cholesterol is associated with the casein in some unknown way and is not removed by solvent extractive means compatible with food processing procedures.

Cheese analogs containing less than 2½ mg/100 gm or 2.5 mg(%) cholesterol are regarded as being substantially cholesterol free and can be marketed as such. Thus, while it is an object of this invention to provide a mehtod for producing casein having a cholesterol content of below about 10 mg(%), a preferred embodiment involves producing casein containing less than 7 mg(%) cholesterol which, when mixed with the other ingredients, will provide a cheese analog containing less than 2.5 mg(%) cholesterol.

SUMMARY OF THE INVENTION

The present invention is a method of precipitating casein having a reduced cholesterol content from skim milk. The method comprises the steps of:

(a) maintaining the skim milk at a pH of from about 6.0 to about 6.9;

(b) treating the skim milk with pancreatic lipase for a time sufficient to dissociate the casein from cholesterol contained therein;

(c) coagulating the casein by enzymatic means to cause the casein to phase separate and result in a solid, casein phase being dispersed in a liquid, whey phase; and (d) separating the solid, casein phase from the liquid, whey phase.

DETAILED DESCRIPTION

The term pancreatic lipase is intended to include that group of enzymes belonging to the esterases which can be obtained from the pancreas of certain animals. The amount of pancreatic lipase used to treat the skim milk before coagulation is not critical, however, for economic reasons, we prefer to use an amount sufficient to provide from 17 to 31 lipase units (LU) and 16 to 27 Northrup units (NU) per liter of milk. We also prefer to use a pancreatic lipase in which the NU/LU ratio is greater than 0.85. The following assays were used to determine the NU and LU values of the pancreatic lipase used in our experimentation:

COLORIMETRIC NORTHROP ASSAY

Principle

This assay is based on a thirty-five (35) minute proteolytic hydrolysis of a casein substrate at pH 7.4 and 40° C. Unhydrolyzed substrate is precipitated with acetate buffer, pH 4.0, and filtered off. Solubilized casein is then determined colorimetrically.

Reagents (1) Casein Substrate, 0.2% (W/U)

Weigh 2.0 gm (moisture-free-basis) of Casein (NBC) into a 100 ml of Borate-phosphate-Citrate buffer, pH 8.0 and allow the casein to swell at room temperature for 30 minutes. Add 880 ml of distilled water and place the substrate in a 40° C. water bath for 45 minutes. The pH of the substrate should be 7.4. If not, adjust substrate to pH 7.4 at 40° C. Cool substrate to 25° C. and dilute to 1000 ml with distilled water.

(2) Borate-Phosphate-Citrate Buffer, pH 8.0

Dissolve 5.15 gm of anhydrous boric acid, 23.09 gm of disodium phosphate heptahydrate, and 30.35 gm of sodium citrate dihydrate and dilute to 1000 ml with distilled water.

(3) Acetate Buffer, pH 4.0

Dissolve 60 gm of sodium acetate trihydrate in 700 ml of distilled water and adjust pH to 4.0 with glacial acetic acid. Dilute to 1000 ml with distilled water.

(4) Sodium Hydroxide, 1 N (5) Folin Reagent

Dilute one volume of Folin-Ciocaltean phenol Reagent with 2 volumes of distilled water.

Enzyme Preparation

Prepare an enzyme solution so that one ml of the final dilution will give a $\Delta A$ of 0.3–0.5.

Procedure

1. Pipette 50 ml of casein substrate into 125 ml Erlennayer flasks. Allow one flask for each enzyme sample and one for a blank.

2. At zero time, rapidly pipete one ml of an appropriate enzyme dilution into the equilibrated substrate.

3. After exactly 35 minutes incubation, add 25 ml of acetate buffer, pH 4.0, to each flask to stop the reaction.

4. Prepare a substrate blank containing 50 ml of casein substrate, one ml of water and 25 ml of acetate buffer.

5. Filter through Whatman No. 42 filter paper. The filtrate must be absolutely clear.

6. Pipette 2 ml of filtrate into 3 ml 1 N NaOH and mix well. Pipette 1 ml of dilute phenol reagent into each tube and mix well.

7. Exactly ten minutes after the addition of the dilute phenol reagent, determine the absorbance of each sample at 660 nm against the substrate blank.

Calculation

One Northrop Unit (NU) is that amount of enzyme which gives 40% hydrolysis of the casein substrate under the condition of the assay.

$NU/gm = (\Delta A \times 164)/w$ $\Delta A$ = Absorbance of filtrate at 660 nm

164 = Fixed relationship between color development by phenol reagent and pancreatic protease hydrolysis.

W = mg of enzyme added to digest in one ml aliquot.

LIPASE ASSAY

Principle

This assay measures the amount of fatty acids released from an olive oil emulsion by the action of lipase under controlled conditions of time, temperature and pH.

Reagents

1. Phosphate Buffer, 0.1 M, pH 7.3
2. Substrate, Olive Oil Emulsion

Slowly add 200 mg of sodium benzoate and 7.0 gms of USP Gum Arabic to 93 ml of 0.1 M phosphate buffer in a Waring Blender running at slow speed (by using a Powerstat set at 25 to 30). When these reagents are completely dissolved, slowly add 93 ml of USP Olive Oil. When all the oil has been added, blend at this speed for 3 minutes and then at high speed for 5 minutes.

3. Buffered Substrate

Into a tared 100 ml volumetric flask add 54.40 gm of the olive oil emulsion and bring to volume with the 0.1 M phosphate buffer solution.

4. Ethyl Alcohol, 95%
5. Thymolphthalein, 1% (W/V) in 95% ethyl alcohol
6. Sodium Hydroxide, 0.05 N

Procedure

1. Pipette 5.0 ml of the buffered substrate into 50 ml Erlenmeyer flask and place in a 37° C. water bath.

2. Prepare a suitable dilution of the enzyme. Sample dilution will depend on the lipase activity of the preparation.

3. Add 5.0 ml of each enzyme sample to substrate flask. For a blank, add 5.0 ml of water to one substrate flask. Mix well and incubate for exactly 2 hours at 37° C. Swirl the flasks occasionally.

4. Stop reaction by adding 3.0 ml of ethyl alcohol to the flask, add 4 drops of thymolphthalein and mix thoroughly.

5. Titrate each flask with 0.05 N NaOH to a pale blue endpoint.

Calculation

The extent of hydrolysis of the substrate by different levels of enzyme is not linear. In order to obtain good reproducibility the amount of enzyme required to give a titration differnece (sample titer-blank titer) of 4.0 ml of 0.05 N NaOH is the correct amount of enzyme. One lipase unit (LU) is defined as that quantity of enzyme which will librate one milliequivalent of fatty acid under the specified experimental conditions.

$LU/gm = (4.0 \times 0.05 \times 1000)/mg$ enzyme sample 0.05 = N of NaOH 4.0 = titration difference (sample titer-blank titer)

The incubation time after the addition of pancreatic lapase will normally range from 10 to 60 minutes at a temperature range of from 30° C. to 37° C. Longer incubation periods may be employed but are not recommended because they tend to result in a decline in casein yields.

Upon completion of the incubation with pancreatic lipase, the enyzmatic coagulant is introduced in an amount sufficient to cause the desired coagualtion in a reasonable period of time. When the coagulent is single strength rennet, i.e., a commerically available solution of rennet, 3 oz. of which will coagulate 1000 pounds of milk in 20 to 30 minutes at 80° to 90° F., a concentration of from 0.01% to 0.03% (V/V)-vs-the skim milk is sufficient to cause substantially complete coagulation during an incutation period of from 10 to 20 minutes at a temperature of from 30° to 37° C. We have found that the optimum incubation time for this step of the process is inversely proportional to the time period during which the pancreatic lipase is allowed to incubate.

The enzymatic coagulant may be calf rennin used either in its pure form or in the form of impure calf rennet. A microbial rennet such as that obtained from *Endothia parasitica, Mucor miehei* or *Mucor pusillus* can also be used as the coagulant.

Upon recovery and optional drying, the casein is ready for processing into low cholesterol food products such as cheese analogs.

The best mode we have found for carrying out the present invention involves the following steps in which the various amounts of materials can be scaled up proportionately.

A. Place ten gallons of raw skim milk (natural pH of 6.6 to 6.8) into a kettle equipped with a heating jacket;

B. Equilibrate the temperature of the skim milk to 35.5° C. by passing a mixture of steam and water through the jacket;

C. Add a milk solution of 3.75 gm of pancreatic lipase containing 306.3 LU/gm and 176.0 NU/gm.

D. Incubate at 35.5° C. for 20 minutes with slow agitation.

E. Add 7.5 ml of single strength calf rennet extract and mix.

F. Incubate at 35.5° C. for 20 minutes without agitation.

G. Increase the temperature to 65° C. and hold for five minutes. Break the curd by slow agitation with a stirrer and keep at 65° C. for another 10 minutes.

H. Separate the whey from the casein by siphoning.

I. Wash the casein with water twice and remove the washed water by siphoning.

J. Remove excess water from the curd by collecting the casein on a 100 mesh screen.

K. Dry the casein at 40° C. in a vacuum oven or process wet into a cheese analog.

The above described preferred embodiment of the invention involves what we have found to be the most efficacious way of precipitating low cholesterol casein.

It is generally preferred to precipitate the casein at the natural pH of skim milk, i.e., 6.6-6.8, although precipitation at a pH within the range of about 6.0 to 6.9 will result in a casein product containing a substantially reduced cholesterol content.

In the examples which follow the cholesterol content of precipitated casein was determined by the enzymatic assay method of Allain et al., published in Clin. Chem. 20 470 (1974). This method was modified for the determination of cholesterol in foods as follows:

1. EXTACTION OF CHOLESTEROL FROM FOOD SAMPLES a. Weigh 10.0 gm of sample into 250 ml boiling flask.
b. Add 10 ml of 60% (W/W) KOH, 30 ml of 100% ethanol and a few boiling chips.
c. Place on a steam bath and boil for approximately one hour. Allow to cool.
d. Transfer quantitatively to a 500 ml separatory funnel using a small amount of water, running with ethyl alcohol and then petroleum ether.
e. Add 100 ml of petroleum ether and extract. If an emulsion forms, add small amounts of ethyl alcohol until the emulsion breaks.
f. Separate the two phases.
g. Transfer the water layer back to the separatory funnel and repeat extraction two more times with 100 ml petroleum ether.
h. Combine the petroleum ether extracts and wash (two or three times) with about 100 ml of water while gently mixing until the washed solution is no longer alkaline.
i. Dry the petroleum ether extract by filtering through anhydrous sodium sulfate.
j. Evaporate extract to dryness on flash evaporator.
k. Dissolve residue with 1.0 ml of pyridine.

2. ENZYMATIC DETERMINATION OF CHOLESTEROL IN THE EXTRACT

Cholesterol, Cholesterol esters and free cholesterol, in the extract were determined by a multiple enzyme, cholesterol-ester hydrolase, cholesterol oxidase and horseradish peroxidase, reaction. The peroxidase couples with hydrogen peroxide formed by cholesterol oxidase to 4-aminoantipyrine and phenol to form a colored compound that absorbs at 500 nm. The sequence of reaction is shown below:

$$\text{Cholesterol ester} + H_2O \xrightarrow{\text{Cholesterol Esterase}} \text{Cholesterol} + \text{Fatty Acid}$$

$$\text{Cholesterol} + O_2 \xrightarrow{\text{Cholesterol Oxidase}} \text{Cholest-4-en-3-one} + H_2O_2$$

$$H_2O_2 + \text{4-Aminoantipyrine} + \text{phenol}$$
$$\xrightarrow{\text{Peroxidase}} \text{Quinonemine} + 2H_2O$$
$$\text{dye}$$
$$\text{(absorption 500 nm)}$$

3. PREPARATION OF ENZYME-CHROMOGENIC REAGENT a. Dissolve the following substances in the order given in about 90 ml of $H_2O$.

| | |
|---|---|
| $KH_2PO_4$ | 1.496 gm |
| $K_2HPO_4$ | 1.566 gm |
| Na cholate | 0.431 gm |
| Triton X-100 | 0.15 gm |
| 4-aminoantipyrine | 0.0163 gm |
| Phenol | 0.132 gm |
| Cholesterol oxidase | 16.0 unit |
| Cholesterol esterase | 10.0 unit |
| -continued | |
| Peroxidase | 0.004 gm | b. Check pH of reagent, it should be 7.00, if not adjust to 7.0.
c. Dilute to 100 ml with $H_2O$. The solution is stable at least three months in refrigerator or freezer.

4. ASSAY PROCEDURE a. Pipette 3 ml of reagent in a 1 cm cuvette.
b. Place cuvette in spectrophotometer with thermo-regulation at 37° C. Wait at least ten minutes for temperature equilibration.
c. Add and mix (immediately) 50 $\mu$l of extract and then place in cuvette holder.
d. Record OD on a recorder for five minutes.
e. Dilute the extract with pyridine if the sample has $\Delta$OD more than 0.5 in five minutes.

5. CALCULATION $$\text{mg cholesterol/10 gm sample} = \frac{\Delta OD \times 1000 \times \text{Dilution}}{4.704 \times 50}$$

$\Delta$OD = for five minutes reading
1000 = 1 ml of solvent (pyridine)
4.704 = extinction
50 = 50 $\mu$l used for assay

EXAMPLE I

Effect of pH on Cholesterol Content in Enzyme Coagulated Casein

Precipitation of casein at a pH higher than the isoelectric point (4.6) can be done by using a clotting enzyme such as calf rennet. Calf rennet extract, 0.03% (V/V) was added to the milk and gently mixed. The milk was allowed to set at 35.5° C. with no disturbance until clotting was complete; this took about 15 to 20 minutes. At this point the milk casein was cut up gently and gradually heated to 65° C. and then held at that temperature for 10 minutes. Whey was drained off and the casein was washed several times with warm water, pressed for one hour to remove excess water and dried in a 45° C. oven.

The amount of cholesterol remaining in the rennet precipitated casein which was precipitated at the milk's natural pH (6.6) was compared with that of acid precipitated casein. The comparison is as follows:

| | % Casein Yield | pH of precipitation | mg (%) cholesterol | % cholesterol Remaining |
|---|---|---|---|---|
| Acid precipitated (control) | 100.0 | 4.5 | 28.5 | 100.0 |
| Rennet Casein | 95.9 | 6.6 | 13.0 | 45.6 |

The use of an enzymatic precipitation method at a pH of 6.6 will reduce the amount of cholesterol in the precipitated casein, although the amount of reduction is not sufficient for the intended purpose.

The incubation of skim milk with calf rennet was carried out at various pH levels to investigate the effect of pH on the cholesterol level in the resultant casein. The results of this study are set out in Table I.

TABLE I

| Incubation pH | % Casein Yield | mg (%) Cholesterol in Casein |
|---|---|---|
| 5.5 | 92.0 | 21.8 |
| 6.0 | 95.4 | 17.7 |
| 6.2 | 98.5 | 15.3 |
| 6.4 | 100.6 | 14.1 |
| 6.6 | 100.0 | 13.3 |
| 6.8 | 100.1 | 12.7 |
| 7.0 | 65.4 | 12.4 |

This experiment confirms the hypothesis that the association of cholesterol with casein is pH dependent. It can be determined from Table I that as the pH of casein coagulation increases, the amount of cholesterol in the precipitated casein decreases. However, in no case did the amount of cholesterol in the precipitated casein fall below 12 mg(%).

EXAMPLE II

Effect of Pancreatic Lipase on Cholesterol Level in Acid Precipitated Casein

Pancreatic lipase was added to skim milk at the 0.01% (W/V) level and kept in a 37° C. water bath for 30 and 60 minutes. After incubation, the temperature was raised to 48° C. and the casein coagulated at pH 4.6. The results of this experiment are set out in Table II.

TABLE II

| Time of Incubation (min) | % Casein Yield | % Cholesterol Remaining |
|---|---|---|
| 0 | 100.0 | 100.0 |
| 30 | 94.0 | 55.0 |
| 60 | 76.5 | 33.8 |

After 30 minutes incubation with pancreatic lipase, 94% of the acid precipitated casein was recovered from skim milk yet only 55% of the cholesterol remained in the casein. The cholesterol content of the casein recovered from milk which was treated for 60 minutes was reduced to 33.8% but the recovery of casein was only 76.5%. It appears that an unnecessary excess of proteolitic hydrolysis occured during the prolonged treatment with pancreatic lipase, and that while such treatment in and of itself has an effect on the cholesterol level of the subsequently precipitated casein, such effect is not adaquate to achieve the desired result of reducing the cholesterol content to a low level while maintaining a high yield of casein.

EXAMPLE III

In this experiment the two basic findings, i.e., that treatment of skim milk with pancreatic lipase reduces the amount of cholesterol in acid precipitated casein and second that coagulation of milk with a milk clotting enzyme has a beneficial effect on the cholesterol level in the casein, were developed.

Pancreatic lipase was added in skim milk as 0.01% (W/V) and incubated for 60 minutes at 35.5° C. Calf rennet, 0.03% was then added to the pancreatic lipase treated skim milk and the casein allowed to coagulate for 20 minutes. The rest of the steps set out in Example I were then followed. As controls, casein samples were precipitated in the manner decribed in the previous examples. The results of this experiment are set out in Table III.

TABLE III

| Sample | % Casein Yield | mg (%) Cholesterol |
|---|---|---|
| Acid casein | 100.0 | 28.5 |
| Pancreatic lipase treated (acid ppt) | 86.5 | 14.0 |
| Casein ppt. with* rennet | 95.9 | 15.6 |
| Pancreatic lipase* and rennet ppt | 97.6 | 6.3 |

*pH 6.6–6.8

It can be determined from Table III that treatment of milk with pancreatic lipase followed by coagulation with rennet yields a casein with a significantly reduced cholesterol content.

EXAMPLE IV

Effect of Rennet Concentration and Incubation Time on Cholesterol Level in Casein The effects of rennet concentration and time of incubation on cholesterol level in resultant casein were investigated. Fifteen 500 gm portions of skim milk were placed in a 35.5° C. water bath and equilibrated to the bath temperature. Pancreatic lipase, 50 mg., was added to each sample and incubated for 10 minutes. The samples were separated into three groups of five which groups were incubated with rennet for 20, 40 and 60 minutes, respectively. Varying amounts of calf rennet were added to the samples of each group. The results of this experiment are set out in Table IV:

TABLE IV

| | Casein Yield (gm) | mg (%) Cholesterol |
|---|---|---|
| Rennet (ml) | | |
| 20 Minute Incubation | | |
| .1 | 11.54 | 10.2 |
| .3 | 11.82 | 10.7 |
| .6 | 11.62 | 10.5 |
| .9 | 11.54 | 10.8 |
| 1.2 | 11.69 | 9.8 |
| Rennin (ml) | | |
| 40 Minutes Incubation | | |
| .1 | 11.59 | 8.8 |
| .3 | 11.59 | 8.8 |
| .6 | 11.92 | 8.7 |
| .9 | 12.37 | 7.4 |
| 1.2 | 12.35 | — |
| 60 Minutes Incubation | | |
| .1 | 12.19 | 6.9 |
| .3 | 11.91 | 6.9 |
| .6 | 12.00 | — |
| .9 | 11.93 | 6.7 |
| 1.2 | 12.20 | — |

The cholesterol concentration in the casein is not affected by the rennin concentration added to the skim milk. However, it is significantly affected by the incubation time.

EXAMPLE V

Effect of pH on Cholesterol Level in Casein

The optimum pH for the preparation of low cholesterol canein was investigated. The pH of the skim milk was adjusted to various pH values by titrating with 2 N NaOH or 2 N HCl. With the exception of the first 3 runs which were used for control, the pH adjusted skim milk was incubated with 0.01% (W/V) pancreatic lipase for 10 minutes at 35.5° C. and then coagulated with 0.03% (V/V) of calf rennet and incubated for 20 minutes. The results of this experiment are set out in Table V:

TABLE V

| pH | Pancreatic Lipase | Rennet | % Casein Yield** | mg (%) Cholesterol |
|---|---|---|---|---|
| 4.6* | — | — | 100 | 28.7 |
| 6.6 | — | + | 102 | 11.2 |
| 7.0 | — | + | 104 | 9.6 |
| 7.0 | + | + | No coagulation | — |
| 6.8 | + | + | 99 | 5.3 |
| 6.6 | + | + | 107 | 5.4 |
| 6.4 | + | + | 112 | 6.7 |
| 6.2 | + | + | 112 | 8.3 |
| 6.0 | + | + | 111 | 10.2 |

*acid precipitated at pH 4.6
**Casein yield by acid precipitation is counted as 100% recovery. Greater than 100% yield indicates that higher casein yields were detected than was the case with acid precipitation.

In order to precipitate casein having a cholesterol content below 10 mg(%) it is necessary to pre-treat the milk with pancreatic lipase and to cause precipitation at a pH of about 6.0 or above. The cholesterol content continues to decrease as the pH is adjusted upwards toward neutrality. However, since precipitation did not occur at pH 7, the upper practical limit is about pH 6.9.

EXAMPLE VI

Effect of Various Milk Coagulants on Cholesterol Level in Casein

A comparative study of the effect on cholesterol level in casein precipitate using calf rennet and Marzyme ® (*Mucor miehei* microbial rennet) was investigated by pretreating 500 ml of skim milk with pancreatic lipase and then precipitating the casein with one of the enzymatic coagulating agents under the conditions set out in the second paragraph of Example III. The results are set out in Table VI:

TABLE VI

| Pancreatic Lipase | Rennet | mg (%) Cholesterol |
|---|---|---|
| Batch # 1032 | | |
| 50 mg | calf | 7.6 |
| 50 mg | microbial | 8.3 |
| Batch # 5827 | | |
| 50 mg | calf | 11.5 |
| 50 mg | microbial | 11.1 |

While this experiment was not optimized to achieve the lowest possible cholesterol concentration in the precipitated casein, the data of Table VI indicates that there is no significant difference in cholesterol level whether the casein is precipitated with calf or microbial rennet.

EXAMPLE VII

Pilot Plant Trial

Thirty gallons of skim milk was placed into a 50 gallon kettle equipped with a heating jacket. The temperature of the milk was equilibrated to 35° C. by passing a steam-water mixture through the jacket. Pancreatic lipase, 0.01% (W/V) -VS- skim milk was added and incubated for 30 minutes with slow stirring. The casein was coagulated by adding 0.02% (V/V) of rennet to the milk. After about 15 minutes the casein formed a curd. The temperature of the curd was raised to 65° C. for 5 minutes and the mixture was stirred at that temperature for another 10 minutes to break down the curd. After settling of the casein particles, the whey was removed by siphoning. The casin was washed twice with about 15 gallons of water whereupon excess water was removed by collecting the casein on a fine screen (about 100 mesh). The wet casein was dried in a vacuum oven at 40° C.

Another batch of casein was prepared from 30 gallons of skim milk following the above procedure except that Marzyme II ® (chemically modified *Mucor meihei* microbial rennet) was used instead of calf rennet. Analysis of the precipitated casein revealed that 3.96 mg(%) and 3.60 mg(%) cholesterol, respectively, remained in the calf rennet and Marzyme II ® coagulated casein.

Cheese analogs were prepared from the casein prepared in this experiment. The dried enzymatic casein was found to be very stable at room temperature. No abnormal taste or texture were detected in a cheese analog which was prepared from three month old dried enzymatic casein.

What is claimed is:

1. A method of obtaining casein having a reduced cholesterol content from skim milk which method comprises the steps of:
   (a) maintaining the skim milk at a pH of from about 6.0 to about 6.9;
   (b) adding to the skim milk a pancreatic lipase having lipase activity and protease activity in an amount and of an activity sufficient to provide from 17 to 31 lipase units and 16 to 27 protease Northrop units per liter of skim milk and allowing the resultant mixture to incubate for a time sufficient to dissociate the casein from cholesterol contained therein;
   (c) coagulating the casein by enzymatic means to cause the casein to phase separate and result in a solid casein phase being dispersed in a liquid, whey phase; and
   (d) separating the solid, casein phase from the liquid, whey phase.

2. The method of claim 1 wherein the ratio of protease Northrop units to lipase units is greater than 0.85.

3. The method of claim 1 wherein the incubation time after addition of the pancreatic lipase is from 10 to 60 minutes and the temperature is within the range of from 30° to 37° C.

4. The method of claim 1 wherein the enzymatic coagulant is calf rennet.

5. The method of claim 4 wherein the calf rennet is single strength and is employed in a concentration of from 0.01% to 0.03% (V/V) of the skim milk being treated.

6. The method of claim 1 wherein the enzymatic coagulent is microbial rennet.

7. The method of claim 6 wherein the microbial rennet is that obtained from *Endothia parasitica, Mucor miehei* or *Mucor pusillus.*

8. The method of claim 1 wherein the pH is from 6.6 to 6.8.

9. The method of claim 1 wherein coagulating by enzymatic means is carried out for 10 to 20 minutes at a temperature of from 30° to 37° C.

10. A method of obtaining low cholesterol casein from skim milk, which method comprises the steps of:
   (a) maintaining the skim milk at a pH of from 6.6 to 6.8,
   (b) treating the milk with a pancreatic lipase having lipase activity and protease activity in an amount and of an activity sufficient to provide 17 to 31 lipase units and 16 to 27 protease Northrop units per liter of milk with a ratio of protease Northrop units to lipase units of greater than 0.85 for a period of from 10 to 60 minutes at a temperature within the range of from 30° to 37° C.,
(c) coagulating the milk by adding thereto 0.01% to 0.03% (V/V) of the skim milk of single strength calf rennet and incubating the treated milk for a period of from 10 to 20 minutes at a temperature of from 30° to 37° C. to form a solid casein phase in a liquid whey phase, and
(d) separating the solid casein phase from the liquid whey phase.

* * * * *